Oct. 11, 1960                F. F. JOHNSON                2,956,165
                            BOREHOLE APPARATUS

Filed June 1, 1955                                    2 Sheets-Sheet 1

INVENTOR.
FRANK F. JOHNSON
BY *Robert Hoctfield*
HIS ATTORNEY.

Oct. 11, 1960 F. F. JOHNSON 2,956,165
BOREHOLE APPARATUS
Filed June 1, 1955 2 Sheets-Sheet 2

INVENTOR.
FRANK F. JOHNSON
BY Robert Hockfield
HIS ATTORNEY.

United States Patent Office 2,956,165
Patented Oct. 11, 1960

2,956,165

BOREHOLE APPARATUS

Frank F. Johnson, Danbury, Conn., assignor, by mesne assignments, to Schlumberger Well Surveying Corporation, Houston, Tex., a corporation of Texas Filed June 1, 1955, Ser. No. 512,474

10 Claims. (Cl. 250—83.3)

This invention relates to borehole apparatus for deriving radioactivity logs of earth formations traversed by a borehole and, more particularly, pertains to new and improved apparatus of this general type wherein indications dependent upon the energy level of incident radiant energy are obtained.

Informative logs are presently obtained by deriving indications of the intensity of radiant energy, such as gamma rays, occurring in earth formations either naturally or under induced conditions. It has also been proposed that useful information could be obtained by observing the radiant energy at one or more selected energy levels. For this purpose, an energy-selective detection system may be employed, for example, of the type comprising a scintillation element optically coupled to a photomultiplier, in turn electrically coupled to one or more pulse-height selectors.

In general, many presently-available energy-selective detectors of the scintillation type tend to drift in energy calibration. Thus, under the extremely severe conditions imposed on equipment intended for borehole use, many instabilities may occur. For instance, the amplification in the photomultiplier or in associated circuits may vary with ambient temperature either directly, or as a result of changes in power supply voltage caused by temperature variations. Since energy selection is based on pulse height, it is obvious that a change in amplification whether due to temperature or any other cause directly and adversely affects the energy response of the system, and accurate measurements may not always be possible.

It is, therefore, an object of the present invention to provide new and improved borehole apparatus for deriving energy-dependent radioactivity logs in which the foregoing deficiencies of prior arrangements are obviated.

Another object of the present invention is to provide new and improved radioactivity logging apparatus capable of providing accurate indications dependent upon the energy of incident radiant energy.

In accordance with the present invention, apparatus for exploring a borehole comprises a carrier adapted to be passed through the borehole. The apparatus further comprises a detection system including radiant energy ressponsive means supported by the carrier for providing an electrical signal dependent upon the energy level of incident radiant energy. A source of radiant energy is supported by the carrier for irradiating the radiant energy responsive means with radiant energy of a predetermined energy level. Means are provided for deriving indications reponsive to a component of the electrical signal representing radiant energy at the predetermined energy level.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
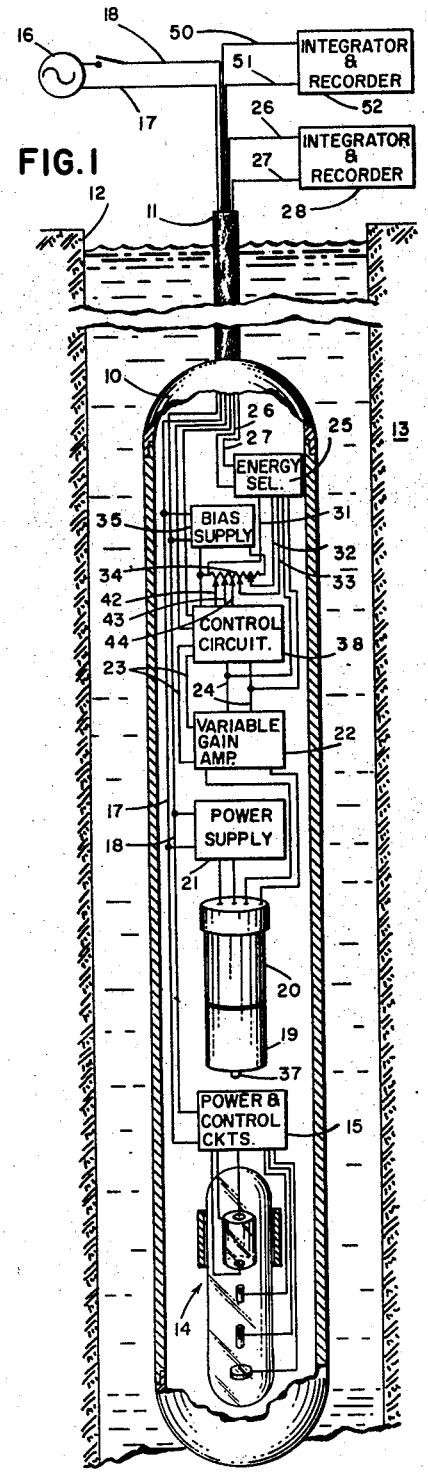
Fig. 1 is a view in longitudinal cross section of borehole apparatus embodying the present invention, various electrical components of the apparatus being represented schematically in block form.

As shown in Fig. 1 of the drawings, apparatus constructed in accordance with the present invention is enclosed by a housing 10 suspended by a cable 11 in a borehole 12 that traverses earth formation 13. The cable 11 may be provided with the usual armor and a number of insulated electrical conductors for completing circuit connections between equipment at the surface of the earth and components within housing 10. The cable 11 may also be employed together with a conventional winch (not shown) for lowering and raising housing 10 in borehole 12 in the customary manner.

Supported within housing 10 at the lower end thereof is a source of neutrons, such as a neutron generator 14 which may be of the type disclosed in the copending application of J. T. Dewan, filed April 9, 1952, bearing the Serial No. 281,378 and assigned to the same assignee as the present invention. A power and control circuit 15 coupled to generator 14 is energized by a power source 16 located at the surface of the earth via insulated conductors 17 and 18 of cable 11. Of course, other types of neutron generators suitable for borehole use may be employed as may the so-called natural sources. For example, neutrons may be derived from a mixture of radium and beryllium.

As stated in the Dewan application, generator 14 produces neutrons at an energy level of 14 million electron volts (m.e.v.) which irradiate earth formations 13. Such bombardment by neutrons may induce gamma radiation through inelastic scattering of fast neutrons as well as by capture of neutrons which are slowed to thermal energies. The resulting gamma radiation may have a variety of energies depending, for example, on the nature of the material making up the earth formations under investigation. Some of the induced radiant energy returns toward housing 10 and may be intercepted by a radiant energy responsive means which may be in the form of a scintillation type detector comprised of a scintillation crystal 19 optically coupled to a photomultiplier 20. A power supply 21 connected to conductors 17 and 18 provides the necessary voltages for photomultiplier 20.

The gamma radiation incident on crystal 19 produces pulses of light energy of an intensity representing the energy of the gamma radiation. These pulses are converted to corresponding electrical pulses by photomultiplier 20. The electrical pulses are supplied to a conventional variable gain amplifier 22 controlled by a potential supplied thereto via conductors 23. The manner in which this control potential is derived will be described in detail hereinafter. The output circuit of the variable gain amplifier 22 is coupled by means of conductors 24 to an energy selector 25 connected by conductors 26 and 27 of cable 11 to an integrator and recorder unit 28 at the surface of the earth.

Figure 2:
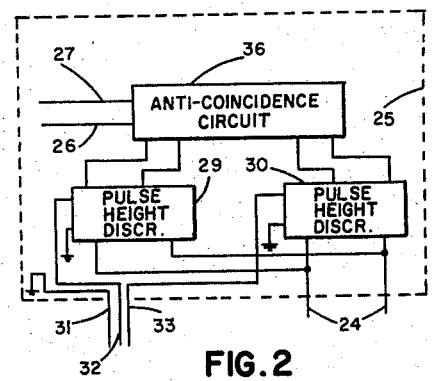
Figs. 2 and 3 represent detailed block diagrams of portions of the circuit arrangement shown in Fig. 1.

Energy selector 25 may be constructed in the manner illustrated in Fig. 2 where it is shown to comprise a pair of conventional pulse-height discriminators 29 and 30 supplied with the signal at leads 24. Each of the discriminators 29 and 30 is adjusted in a known manner to pass all pulses having an amplitude above a level determined by a bias potential supplied thereto. Discriminator bias is derived via a common connection 31 and leads 32 and 33 which extend to individual, adjustable taps of a voltage divider 34 (Fig. 1). The voltage divider 34 is connected to a bias supply 35 energized by source 16 via conductors 17 and 18.

The output of each of the pulse-height discriminators 29 and 30 is supplied to an anti-coincidence circuit 36 of conventional construction. Circuit 36 operates in a well known manner to provide an output pulse in response to each pulse from discriminator 29 which is not accompanied by a coincident pulse at discriminator 30. Accordingly, the output of anti-coincidence circuit 36 represents a range of pulse amplitudes corresponding to a desired range of energies in the radiant energy incident upon detector 19, 20.

The resulting pulse signal at leads 26, 27 is fed to the integrator portion of unit 28 to derive a potential representing the rate of occurrence of the pulses. The recording medium within unit 28 is displaced in proportion to movement of housing 10 through borehole 12 and thus a continuous log of gamma radiation within the desired range of energy levels is obtained.

As housing 10 is lowered into a borehole, various instabilities may occur. For example, the amplification within photomultiplier 20 may change directly with time and/or temperature. Moreover, the potential supplied by power supply 21 may vary thereby to alter the amplification of the photomultiplier 20. Obviously, since energy selector 25 is responsive to the amplitude of the pulses supplied thereto, any change in amplification in the detection system undesirably varies the range of energy levels under observation.

To obviate this deficiency, in addition to primary source 14, there is provided within housing 10 a secondary radiation source 37 disposed closely adjacent to scintillation crystal 19. Source 37 may, for example, be a gamma ray emitter preferably providing gamma radiation at an energy level lower than the desired energy level of which a recording is made in unit 28. A typical gamma emitter which may be employed is zinc 65 having a half life of 250 days. It emits gamma rays at 1.11 m.e.v. which irradiate scintillation crystal 19. Many of the resulting flashes of light energy have an amplitude corresponding to the energy of the incident radiant energy and these are converted to an electrical signal by photomultiplier 20 and supplied to variable gain amplifier 22. The pulses representing radiation from source 37 are effectively rejected by energy selector 25, however they are utilized in a control circuit 38 connected to the output circuit of amplifier 22 by leads 24.

Figure 3:
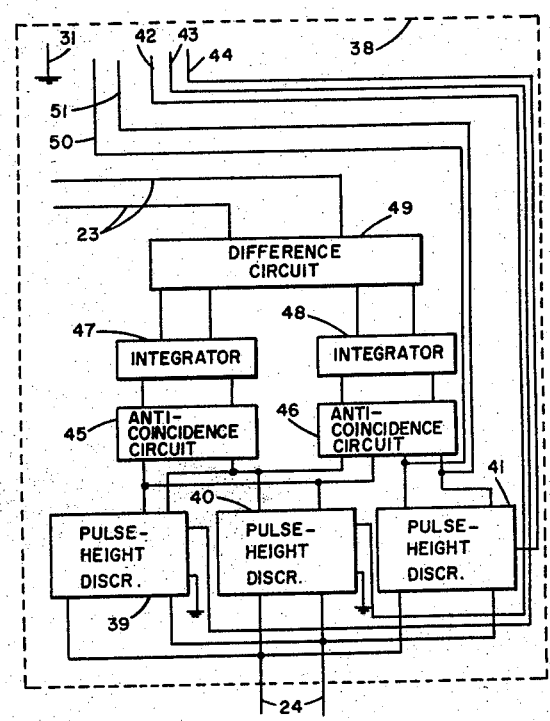

As shown in Fig. 3, control circuit 38 includes three pulse-height discriminators 39, 40 and 41 coupled to leads 24. Bias for each of these discriminators is supplied over leads 42, 43, and 44 which extend to individual taps of voltage divider 34. The manner in which the biases are adjusted will be described hereinafter. Pulse-height discriminators 39 and 40 are coupled to one anti-coincidence circuit 45 while pulse-height discriminators 40 and 41 are coupled to another anti-coincidence circuit 46. These operate in essentially the same manner described in connection with anti-coincidence circuit 36 of Fig. 2. Output pulses from anti-coincidence circuits 45 and 46 are supplied to respective integrators 47 and 48 coupled to a conventional difference circuit 49 in which the arithmetic difference of the voltages from the integrators is derived at leads 23.

In order to obtain a record of another characteristic of earth formations 13 the output of pulse-height discriminator 41 is coupled by means of leads 50 and 51 to an integrator and recorder unit 52 (Fig. 1) at the surface of the earth. The recording medium in unit 52 is arranged to move in proportion to displacement of housing 10 through borehole 12.

Figure 4:
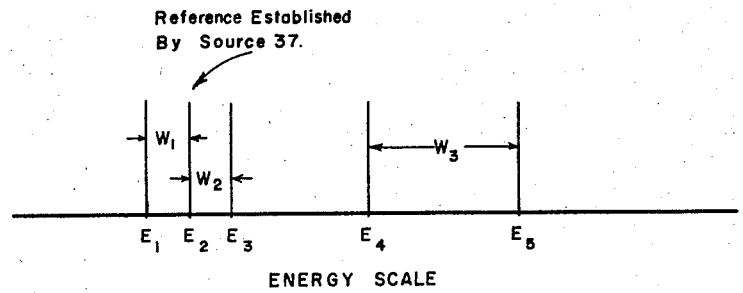
Fig. 4 is an energy diagram useful in explaining the operation of the apparatus illustrated in Figs. 1–3.

In adjusting the apparatus illustrated in Figs. 1–3 for operation, an operating switch for source 16 is closed while housing 10 is at the surface of the earth and a "warm-up" period is permitted to elapse. The taps of voltage divider 34 to which leads 42, 43 and 44 are connected are then adjusted so that each of the pulse-height discriminators 39, 40 and 41 pass all pulses representing energies above the levels $E_1$, $E_2$, $E_3$, respectively, represented on the energy scale of Fig. 4. In this example, energy $E_2$ is at a level of 1.11 m.e.v., the level of the reference energy supplied by source 37. Thus, the pulse output of anti-coincidence circuits 45 and 46 represents two contiguous ranges of energy levels, designated $W_1$ and $W_2$ in Fig. 4. It will be noted that the pulse-height discriminators 29 and 30 (Fig. 2) may be adjusted at the energy levels $E_4$ and $E_5$ to define a range of energy levels, $W_3$, higher than both of the ranges $W_1$ and $W_2$.

It is therefore evident that the integrators 47 and 48 derive two voltages each of which has a magnitude dependent upon the rate of occurrence of pulses falling in a respective one of the energy ranges $W_1$ and $W_2$. If these voltages are equal, indicating that the ranges $W_1$ and $W_2$ properly straddle energy $E_2$, difference circuit 49 produces no potential at leads 23 and the gain of variable gain amplifier 22 is unchanged. If however, the gain anywhere in the system changes, the energy ranges $W_1$ and $W_2$ shift, and the distribution of pulses in these ranges is altered. Accordingly, one of the voltages derived by integrators 47 and 48 becomes greater than the other, and difference circuit 49 applies a voltage to leads 23 which has a magnitude and polarity representing the amount and direction of the shift. This voltage produces a compensating change in amplification of the variable-gain amplifier 22 and the energy ranges $W_1$ and $W_2$ are re-established relative to reference energy $E_2$.

It is thus apparent that the apparatus embodying the present invention includes means responsive to the electrical signal of photomultiplier 20 for adjusting an operating characteristic, such as amplification, of the system in accordance with a component in the electrical signal representative of radiant energy at the predetermined energy level produced by source 37. Since major instabilities in the detection system are due to variations in the amplification, this type of compensation minimizes the results of these, as well as other, instabilities. Therefore, housing 10 may be passed through borehole 12 and accurate measurements may be made and recorded in unit 28 of the gamma radiation within energy range $W_3$ emitted by the earth formations 13 under neutron bombardment by source 14.

The rate of occurrence of all pulses above energy $E_3$ is simultaneously recorded in unit 52. This provides an indication of the neutron capture qualities of the earth formations which may be of use in itself. However, if desired this indication may be employed to compensate the indication in unit 28 thereby to provide energy measurements that are independent of these qualities. Such compensation may be done either manually or by means of an automatic computer.

It may be appropriate to point out that although zinc 65 has been presented as an illustrative example of a reference source, other emitters may be employed. For example, beta emitters such as chlorine 36 emitting radiation at a maximum energy of 0.73 m.e.v., yttrium 91 at 1.5 m.e.v., strontium 89 at 1.5 m.e.v., as well as many others may be suitably employed. Moreover, alpha ray emitters may also be useful employed, such as actinium 227 emitting radiation at 4.93 m.e.v. Of course other gamma ray emitters may also be utilized, such as silver 110 emitting gamma rays at 1.48, 0.9, and 0.6 m.e.v.

Generally, the half-life of the source used should be such that frequent replenishment is avoided. However, the control afforded by the system illustrated in Figs. 1–3 is essentially independent of source strength with the exception of statistical fluctuations which become increasingly important as the strength of the source decreases. The strength of the reference source, may be very small. For example, 0.01 to 0.1 microcurie provides a sufficient amount of radiant energy for proper operation of the control circuit.

In accordance with another embodiment of the invention, the output of generator 14 may be arranged to provide reference energy at the same time it supplies neutrons for irradiating the earth formations under investigation. For example, some of the 14 m.e.v. neutrons moderated to thermal energies by the drilling mud usually contained by borehole 12 may induce activity in crystal 19. Thus where a sodium iodide crystal is used, gamma radiation at 0.428 m.e.v. induced by interactions between thermal neutrons and iodine can constitute reference energy $E_2$. Alternatively, a small quantity of a compound of boron may be fixed to crystal 19 and reference energy at approximately 0.4 m.e.v. derived by neutron capture in the boron. Of course, for calibration at the surface of the earth, a neutron moderator, such as a paraffin may be employed.

It is evident that since changes in gain due to temperature usually occur at a relatively slow rate, the control circuit need only correct for slow drifts. Therefore, the design requirements need not be as stringent as in an arrangement wherein fast changes take place.

Figure 7:
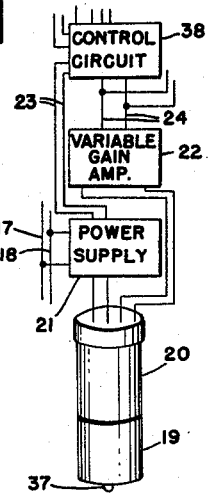
Fig. 7 represents another modification which may be made to the apparatus shown in Fig. 1.

Although a system has been illustrated in which the gain of amplifier 22 is under the control of unit 38, obviously other forms of control may be employed. For example, power supply 21 may be arranged in a known manner so that its output voltage is responsive to a control voltage. Accordingly, unit 38 may be coupled by conductors 23 to the power supply, as shown in Fig. 7, instead of to amplifier 22. The operation of this alternative form of the invention is essentially the same as described in connection with the illustrated arrangement.

Figure 5:
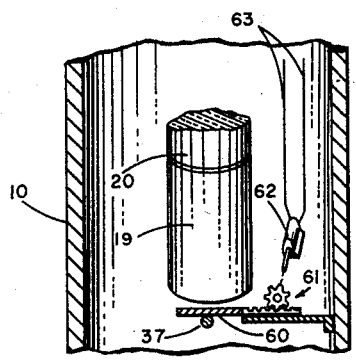
Fig. 5 represents a modification which may be made to the apparatus shown on Fig. 1 featuring another embodiment of the present invention.

If desired, a form of the present invention may be incorporated in a detection system in which a record of a continuous spectrum of energy values is recorded. For example, the taps which control the voltage supplied via leads 32 and 33 to pulse-height discriminators 29 and 30 may be cyclically displaced in synchronism. In this embodiment, as illustrated in Fig. 5, reference source 37 is separated from scintillation crystal 19 by a suitable shield 60 which may, for example, be constructed of lead. The shield normally occupies the illustrated position and is mechanically connected by an appropriate gear system 61 to a motor 62. The motor may be selectively energized via leads 63 thereby to carry the shield from its normal position to a retracted position.

Figure 6:
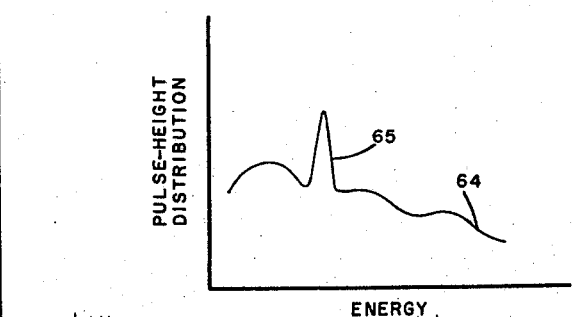
Fig. 6 is an energy diagram useful in explaining the operation of the modified arrangement illustrated in Fig. 5.

In the condition of operation shown in Fig. 5, an energy spectrum such as shown in Fig. 6 by curve 64 may be obtained. When motor 62 is energized to carry shield 60 to its retracted position, radiation from source 37 is permitted to impinge on scintillation crystal 19 and a peak 65 appears in the energy spectrum to serve as a reference mark. After a record is made of the display including the energy spectrum 64 and peak 65 the shield 61 is returned to the position shown in Fig. 5 and peak 65 disappears from the display.

Alternatively, source 37 itself may be movable. In this case a shield may not be required and the motor is arranged to move the source from a remote position in which its radiant energy is effectively prevented from reaching crystal 19 to a position closely adjacent the crystal whereby the reference peak is obtained.

Although the present invention has been illustrated in connection with a radioactivity-type logging system in which earth formations are irradiated by neutrons and the resulting gamma radiation is measured, obviously it may find other applications. For example, it may be used in an arrangement for measuring the naturally occurring gamma radiation.

The invention may also be useful in a logging system wherein the formations are irradiated by neutrons and neutrons of selected energies are measured. The type of reference source that is used depends upon the nature of the neutron detector. For example, if the detector is solely responsive to neutrons, a reference source of monoenergetic neutrons should be employed. In the event the detector responds to other types of radiant energy as well as neutrons, the reference source may be selected accordingly.

As used herein, the term "radiant energy" is intended to denote either wave or particle energy. Accordingly, gamma rays, neutrons and charged particles are deemed to be within the scope of the expression "radiant energy."

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Apparatus for exploring a borehole traversing earth formations comprising; a carrier adapted to be passed through the borehole; a detection system including radiant energy responsive means supported by said carrier and exposed to radiant energy emanating from the earth formations, said system providing an electrical signal dependent upon the energy level of incident radiant energy; a source of beta radiation supported by said carrier for directly irradiating said radiant energy responsive means with beta rays of a predetermined energy level; and means for deriving indications responsive to a component of said electrical signal representing said beta rays and representing gamma radiation emitted by the earth formations.

2. Apparatus for exploring earth formations traversed by a borehole comprising: a carrier adapted to be passed through the borehole; a detection system including radiant energy responsive means supported by said carrier for movement therewith through the borehole, said radiant energy responsive means being exposed to radiant energy emanating from the earth formations and providing at least one electrical signal dependent upon the energy level of incident radiant energy, and said detection system further including means for deriving indications responsive to said electrical signal; a source of radiant energy of a predetermined energy level supported by said carrier for directly irradiating said radiant energy responsive means; and means supported by said carrier responsive to said electrical signal for adjusting an operating characteristic of said detection system in accordance with a component in said electrical signal representative of radiant energy of said predetermined energy level.

3. Apparatus for exploring earth formations traversed by a borehole comprising: a carrier adapted to be passed through the borehole; a primary source of radiant energy for irradiating the earth formations to induce radiant energy exhibiting at least one component having a selected energy level; a detection system including radiant energy responsive means supported by said carrier for movement therewith through the borehole, said radiant energy responsive means being exposed to radiant energy emanating from the earth formations and providing at least one electrical signal dependent upon the energy level of incident radiant energy, and said detection system further including means for deriving indications responsive to said electrical signal; a secondary source of radiant energy of a predetermined energy level other than said selected energy level supported by said carrier for directly irradiating said radiant energy responsive means; and means supported by said carrier responsive to said electrical signal for adjusting an operating characteristic of said detection system in accordance with a component in said electrical signal representative of radiant energy of said predetermined energy level.

4. Apparatus for exploring earth formations traversed by a borehole comprising: a carrier adapted to be passed through the borehole; a detection system including radiant energy responsive means supported by said carrier for movement therewith through the borehole, said radiant energy responsive means being exposed to radiant energy emanating from the earth formations and providing an electrical signal including pulses having an amplitude dependent upon the energy level of incident radiant energy, and said detection system further including means for deriving indications responsive to said electrical signal; a source of radiant energy of a predetermined energy level supported by said carrier for directly irradiating said radiant energy responsive means; means responsive to said electrical signal for deriving a first signal representing pulses having a range of amplitudes lower than the amplitude corresponding to said predetermined energy level and a second signal representing pulses having a range of amplitudes higher than the amplitude corresponding to said predetermined energy level; and means responsive to a preselected combination of said first and said second signals for adjusting an operating characteristic of said detection system.

5. Apparatus for exploring earth formations traversed by a borehole comprising: a carrier adapted to be passed through the borehole; a detection system including radiant energy responsive means supported by said carrier for movement therewith through the borehole, said radiant energy responsive means being exposed to radiant energy emanating from the earth formations and providing an electrical signal including pulses having an amplitude dependent upon the energy level of incident radiant energy, and said detection system further including means for deriving indications responsive to said electrical signal; a source of radiant energy of a predetermined energy level supported by said carrier for directly irradiating said radiant energy responsive means; first, second and third pulse-height discriminators responsive to said electrical signal for deriving individual signals representing pulses having a range of amplitudes above first, second and third values, respectively, said second value corresponding to said predetermined energy level; a pair of anti-coincidence devices, one coupled to said first and said second pulse-height discriminators and the other coupled to said second and said third pulse-height discriminators for deriving a pair of output signals representing pulses corresponding to two contiguous ranges of energy levels below and above said predetermined energy level; and means responsive to a preselected combination of said pair of output signals for adjusting an amplification characteristic of said detection system.

6. Apparatus for exploring earth formations traversed by a borehole comprising: a carrier adapted to be passed through the borehole; a detection system including radiant energy responsive means supported by said carrier for movement therewith through the borehole, said radiant energy responsive means being exposed to radiant energy present in the borehole and providing at least one electrical signal dependent upon the energy level of incident radiant energy, said detection system further including means for deriving indications responsive to said electrical signal, and an element of said detection system having an amplification dependent upon the magnitude of a control potential supplied thereto; a source of radiant energy of predetermined energy level supported by said carrier for directly irradiating said radiant energy responsive means; and means responsive to said electrical signal for deriving a control potential for application to said element of said detection system, said control potential having a magnitude representing variations in said electrical signal from a reference determined by a component therein corresponding to radiant energy of said predetermined energy level.

7. Apparatus for exploring a borehole comprising: a carrier adapted to be passed through the borehole; a detection system including radiant energy responsive means supported by said carrier and exposed to radiant energy present in the borehole, said system providing an electrical signal dependent upon the energy level of incident radiant energy; a source of radiant energy supported by said carrier providing radiant energy of a predetermined energy level; means for controlling said source of radiant energy selectively to irradiate said radiant energy responsive means directly; means for deriving indications responsive to a component of said electrical signal representing radiant energy at said predetermined energy level.

8. Apparatus for exploring earth formations traversed by a borehole comprising: a carrier adapted to be passed through the borehole; a detection system including radiant energy responsive means supported by said carrier for movement therewith through the borehole, said radiant energy responsive means being exposed to radiant energy emanating from the earth formations and providing at least one electrical signal dependent upon the energy level of incident radiant energy and said detection system further including means for deriving indications responsive to said electrical signal; a source of radiant energy supported by said carrier for irradiating the earth formations to induce radiant energy in a given energy range and for directly irradiating said radiant energy responsive means to induce radiant energy therein at a predetermined energy level outside said given energy range; means responsive to said electrical signal for adjusting an operating characteristic of said detection system in accordance with a component in said electrical signal representative of radiant energy of said predetermined energy level.

9. Apparatus for exploring earth formations traversed by a borehole comprising: a carrier adapted to be passed through the borehole; a primary source of radiant energy for irradiating the earth formations to induce radiant energy exhibiting at least one component having a selected energy level; a detection system including radiant energy responsive means and a power supply therefor supported by said carrier for movement therewith through the borehole, said radiant energy responsive means being exposed to radiant energy emanating from the earth formations and providing at least one electrical signal dependent upon the energy level of incident radiant energy and upon the output voltage of said power supply, and said detection system further including means for deriving indications responsive to said electrical signal; a secondary source of radiant energy of a predetermined energy level other than said selected energy level supported by said carrier for directly irradiating said radiant energy responsive means; and means supported by said carrier responsive to said electrical signal and coupled in voltage controlling relation to said power supply for adjusting an operating characteristic of said detection system in accordance with a component in said electrical signal representative of radiant energy of said predetermined energy level.

10. Apparatus for exploring earth formations traversed by a borehole comprising: a carrier adapted to be passed through the borehole; a primary source of radiant energy for irradiating the earth formations to induce radiant energy exhibiting at least first and second components having respective high and low selected energy levels; a detection system including radiant energy responsive means and a power supply therefor supported by said carrier for movement therewith through the borehole, said radiant energy responsive means being exposed to radiant energy emanating from the earth formations and providing three electrical signals dependent upon the energy levels of incident radiant energy and upon the output voltage of said power supply, and said detection system further including means for deriving indications responsive to two of the said electrical signals corresponding to said first and second radiant energy components; a secondary source of radiant energy of a predetermined energy level below said selected high energy level supported by said carrier closely adjacent said radiant energy responsive means for directly irradiating said radiant energy responsive means; and means supported by said carrier responsive to the third of said electrical signals and coupled in voltage controlling relation to said power supply for adjusting an operating characteristic of said detection system in accordance with a component in said third electrical signal representative of radiant energy of said predetermined energy level.

References Cited in the file of this patent

UNITED STATES PATENTS

| | | |
|---|---|---|
| 2,469,461 | Russell | May 10, 1949 |
| 2,648,780 | Herzog | Aug. 11, 1953 |
| 2,659,011 | Youmans et al. | Nov. 10, 1953 |
| 2,689,918 | Youmans | Sept. 21, 1954 |
| 2,705,289 | Youmans | Mar. 29, 1955 |
| 2,725,485 | Scherbatskoy | Nov. 29, 1955 |